United States Patent [19]
Becker

[11] Patent Number: 6,139,039
[45] Date of Patent: Oct. 31, 2000

[54] SHOCK ABSORBING BICYCLE SEAT SUPPORT HAVING VARIABLE HEIGHT ADJUSTMENT

[75] Inventor: William R. Becker, Hilton Head Island, S.C.

[73] Assignee: Becker Suspensions, Inc., Hilton Head Island, S.C.

[21] Appl. No.: 09/338,419

[22] Filed: Jun. 22, 1999

[51] Int. Cl.[7] .................................................. B62K 3/00
[52] U.S. Cl. ........................................ 280/283; 280/275
[58] Field of Search .................................. 280/274, 275, 280/283, 220, 281.1, 288, 280.2, 280.3; 297/195.1, 196, 204, 205, 207, 215, 215.13; 267/132, 133

[56] References Cited

U.S. PATENT DOCUMENTS

| | | | |
|---|---|---|---|
| D. 381,941 | 8/1997 | Chan | D12/111 |
| D. 385,229 | 10/1997 | Chan | D12/111 |
| 4,046,396 | 9/1977 | Taylor et al. | 280/281 R |
| 4,226,435 | 10/1980 | Efros | 280/283 |
| 4,838,569 | 6/1989 | Ford | 280/275 |
| 4,934,724 | 6/1990 | Allsop et al. . | |
| 4,960,271 | 10/1990 | Sebring | 269/323 |
| 5,029,888 | 7/1991 | Allsop et al. . | |
| 5,044,648 | 9/1991 | Knapp | 280/283 |
| 5,240,268 | 8/1993 | Allsop et al. . | |
| 5,308,030 | 5/1994 | Bales | 248/214 |
| 5,356,165 | 10/1994 | Kulhawik et al. . | |
| 5,474,317 | 12/1995 | Piszkin | 280/283 |
| 5,498,014 | 3/1996 | Kulhawik et al. . | |
| 5,611,557 | 3/1997 | Farris et al. . | |
| 5,725,227 | 3/1998 | Mayer . | |
| 5,813,683 | 9/1998 | Kulhawik et al. | 280/275 |
| 5,829,733 | 11/1998 | Becker . | |
| 5,899,479 | 5/1999 | Schroder | 280/283 |
| 6,073,949 | 6/2000 | O'Hare et al. | 280/283 |

*Primary Examiner*—Brian L. Johnson
*Assistant Examiner*—Daniel Yeagley
*Attorney, Agent, or Firm*—Harris Beach & Wilcox, LLP

[57] ABSTRACT

Apparatus for shock-absorbingly supporting a bicycle seat on a bicycle frame. A longitudinal beam means is pivotably attached via transverse bearings a first end to the frame, the beam bearings being configured to permit pivot motion only in a plane containing the bicycle frame. The beam is supportive of seat device near an opposite end of the beam. Shock absorbing means, preferably an adjustable gas strut, is disposed below the beam, and is connected at a first strut end to the frame and at an opposite strut end to the beam adjacent the seat device to form a triangular strut shock-absorbing suspension for the seat device wherein the triangle side comprising the strut is variable in length. In a preferred embodiment, the length of the strut may be remotely adjusted by the rider to vary the distance between the seat and the pedals or ground. In a further preferred embodiment, the beam includes a control to adjust the attitude of the seat in accordance with the height thereof. In a still further preferred embodiment, the load operating range of the strut may be varied to accommodate different riders of different weights.

2 Claims, 4 Drawing Sheets

United States Patent 6,139,039

SHOCK ABSORBING BICYCLE SEAT SUPPORT HAVING VARIABLE HEIGHT ADJUSTMENT

DESCRIPTION

BACKGROUND OF THE INVENTION

The present invention relates to apparatus for supporting the seat of a bicycle on a bicycle frame, more particularly to such apparatus for absorbing road impact shocks otherwise transmittable from the frame to the seat, and most particularly to such shock-absorbing apparatus wherein the length of a shock-absorbing strut may be varied at will by a rider to vary the distance between the seat and the bicycle pedals or the ground.

Conventional bicycles in common use today typically have a rigid tubular frame to which are attached a front wheel which is pivotable via handlebars for steering, a sprocketed rear wheel, a pedaled sprocket and continuous chain for driving the rear wheel, and a seat for a single rider. Such seats, especially those intended for touring and/or racing competition, typically are narrow and hard, affording little isolation and protection for the rider from road shocks, which can cause muscle fatigue and nerve damage.

Further, in conventional bicycles, the seat typically is mounted on a rod which extends downwards into a seat-supporting tubular member of the frame wherein the rod is captured and held by a bolted clamp to fixedly retain the seat at a desired distance from the pedals. Optimally, this distance to a lower pedal is approximately the full leg extension of the rider; thus, to avoid falling over when stopping, the rider must leave a seated position and stand on one pedal while removing the other leg from the other pedal and extending the other leg to the ground. There is no means in conventional bicycles whereby the rider may vary at will the distance from the seat to the pedals or to the ground while remaining seated.

In the prior art, the absorption of road shocks is addressed in one of two ways, either by resiliently articulating the bicycle frame such that shocks are absorbed by flexing of the frame before reaching the rider, or by allowing a rigid frame to receive the shocks but isolating the rider from the frame, or by a combination of the two.

U.S. Pat. No. 5,356,165 issued Oct. 19, 1994, and U.S. Pat. No. 5,498,014 issued Mar. 12, 1996, both to Kulhawik et al., disclose a bicycle suspension wherein the rear wheel and a pedaled sprocket are mounted to a rigid rear frame, and the front wheel is mounted to a conventional pivotable fork in a rigid front frame pivotably and shock-absorbingly connected to the rear frame at a forward end thereof, the seat being rigidly mounted on a rearward extension of the front frame.

U.S. Pat. No. 5,611,557 issued Mar. 18, 1997 to Farris et al. discloses a bicycle suspension system wherein the front wheel is mounted to a conventional pivotable fork in a rigid front frame which also supports a pedaled sprocket, the rear wheel is mounted to a rigid rear frame pivotably connected to the front frame forward of the sprocket, and the seat is mounted on a beam pivotably connected to both the front frame and the rear frame via an action comprising a walking beam, various lever arms, and a shock absorber.

U.S. Pat. No. 5,752,227 issued Mar. 10, 1998 to Mayer discloses an action similar to that of Farris et al. wherein the seat mounting means is actually connected to both a front frame and a rear frame.

U.S. Pat. No. 4,934,724 issued Jun. 10, 1990; U.S. Pat. No. 5,029,888 issued Jul. 9, 1991; and U.S. Pat. No. 5,240,268 issued Aug. 31, 1993, all to Allsop et al., disclose a bicycle having a substantially rigid frame, the seat support post being omitted and the seat being mounted at the rear end of a flexible shock-absorbing beam attached at its forward end to, and extending freely in space and rearwardly from, the frame at a point behind the front fork.

My U.S. Pat. No. 5,829,733 ('733) issued Nov. 3, 1998, the disclosure of which is hereby incorporated herein by reference, discloses a shock absorbing and adjustable height bicycle seat mounting assembly for installation onto or into a bicycle frame vertical seat support member. The assembly comprises a gas spring and an actuator which may be remotely adjusted by a rider at will to change the height of the seat, as for mounting and dismounting the bicycle and for optimizing the riding position, without altering the shock-absorbing capability of the assembly.

SUMMARY OF THE INVENTION

It is a principal object of the present invention to provide improved means for shock-absorbingly supporting a bicycle seat on a bicycle frame.

It is a further object of the invention to provide such improved means to include means for adjustment of the height of the seat by a rider while seated on the seat.

It is a still further object of the invention to provide such improved means to include means for control of the attitude of the seat, including change or maintenance thereof, when the seat is adjusted for height.

It is a still further object of the invention to provide such improved means which are easily retrofittable to existing bicycle frames.

It is a still further object of the invention to provide such means without resort to other articulation of a bicycle frame.

Briefly described, beam means including an inflexible longitudinal beam is pivotably attached at a first end thereof to a bicycle frame, preferably at a forward end of the beam means and preferably behind the fork-supporting tube of the frame. Bearings are disposed between the beam means and the frame to provide a transverse pivot axis such that pivot motion of the beam relative to the frame is permitted only in a plane containing the bicycle frame. A bicycle seat is mounted near or at the rear end of the beam. Shock absorbing means, preferably an adjustable-length gas spring, also known as a gas strut, is disposed below the beam between the beam and the frame, being pivotably connected at a first strut end to the frame and at a second strut end to the beam to form a triangular strut shock-absorbing suspension for the seat wherein the side comprising the strut may be varied indefinitely in length as desired by the rider or instantaneously as a result of road shocks imposed by travel of the bicycle.

In a preferred embodiment, the length of the strut may be remotely adjusted by the rider, as by a control cable and lever mounted at a convenient location on the frame or handlebars, to vary the distance between the seat and the pedals or ground. In a further preferred embodiment, the load operating range of the strut may be varied to accommodate different riders of different weights.

In a further preferred embodiment, a control rod is pivotably connected between the frame and an extension of the seat mounting post to form a quadrangular actuation whereby the attitude of the seat may be changed or maintained with height of the seat. The sides of the actuation are the beam, the seat mounting post, the control rod, and the frame, the beam and the control rod being opposite sides of the actuation. In the special case wherein the quadrangular actuation defines a parallelogram, the attitude of the seat is unchanged with the height thereof in response to changing length of the shock absorber. The control rod may be disposed either above or below the beam with equal effect.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION

Figure 1:
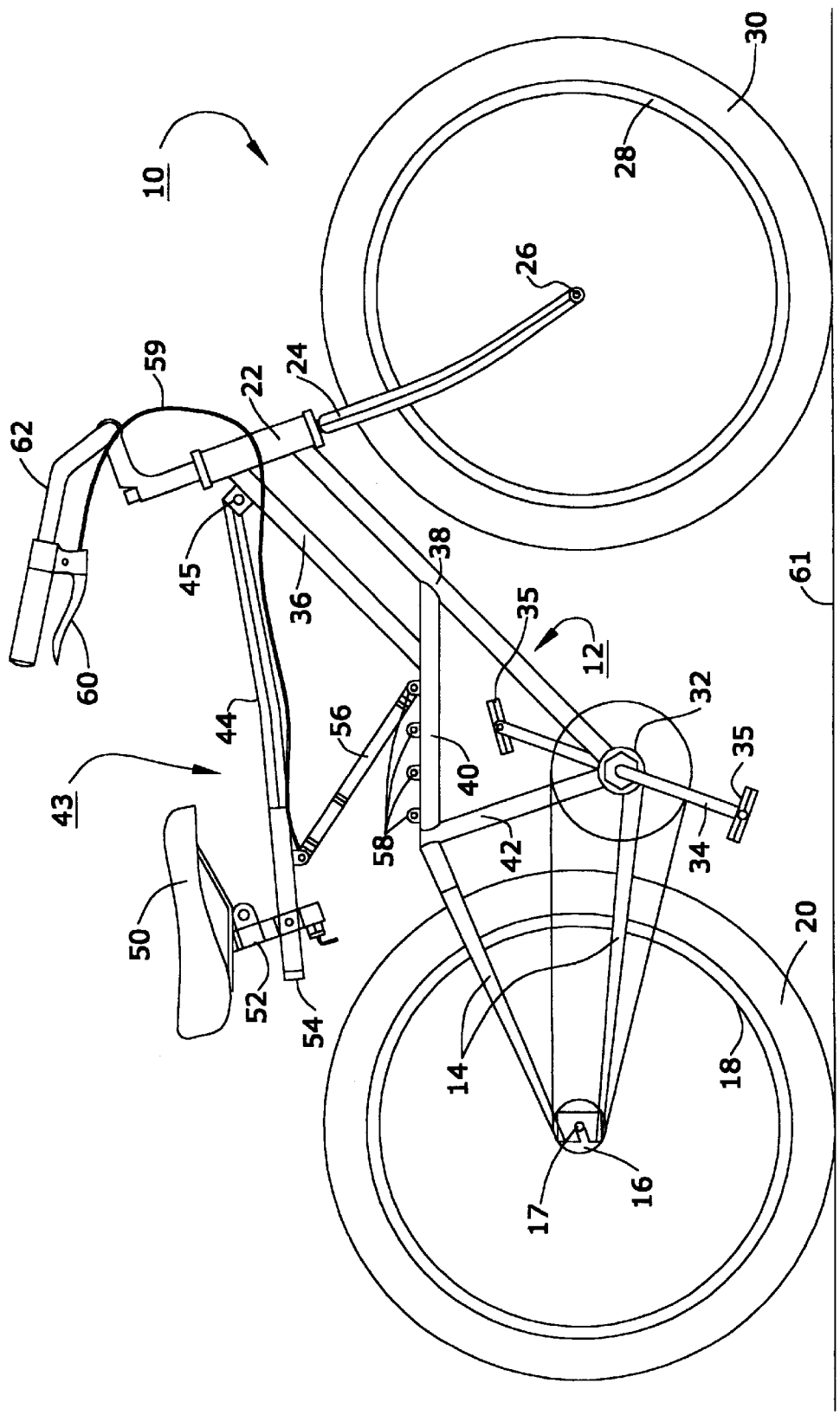
FIG. 1 is an elevational view of a bicycle provided with a shock absorbing bicycle seat support in accordance with the invention.

Referring to FIG. 1, a bicycle 10 includes a rigid, non-articulated frame 12 formed of tubular metal members as by welding or brazing as is known in the art of bicycle manufacture. Frame 12 comprises a rear fork 14 for supporting rear hub 16 on rear axle 17, rear wheel 18, and rear tire 20; a front fork-supporting tube 22 receivable of turnable front fork 24 for supporting handlebars 62, front hub 26, front wheel 28, and front tire 30; a crank-supporting tube 32 for supporting sprocketed crank 34 and pedals 35; and connecting tubes 36, 38, 40, and 42 for connecting rear fork 14 to front fork-supporting tube 22 to provide a rigid frame resistant to torsional and flexural deformations. In conventional bicycles, tube 42 is a seat-supporting tube for receiving an extension of seat-supporting post 52. The arrangement of tubes forming a frame as shown in FIG. 1 is only exemplary. Other arrangements of tubing forming a rigid, non-articulated frame supportive of at least one front wheel and at least one rear wheel, as may be known in the prior art, are fully within the scope of the subject invention.

Figure 3:
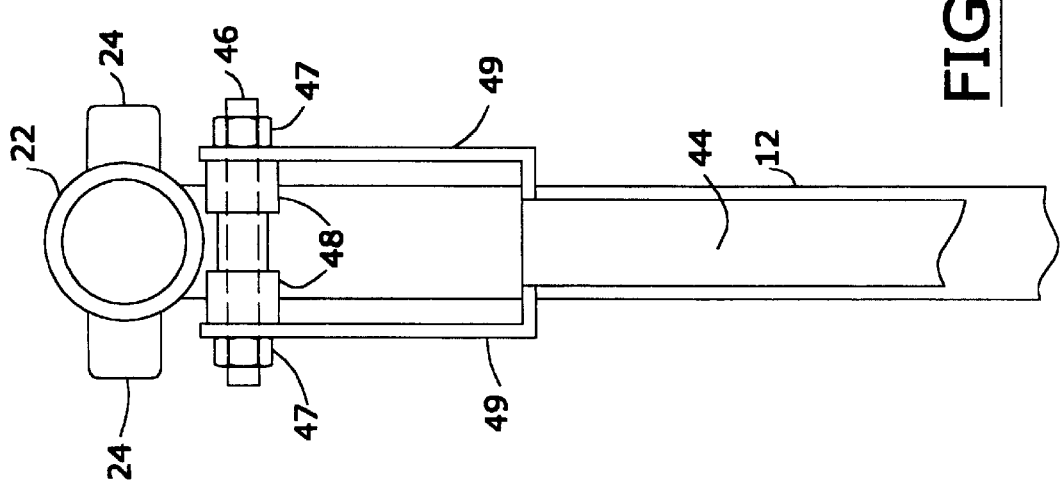
FIG. 3 is a plan view like that shown in FIG. 2, showing and alternative configuration of the beam to provide increased resistance of the beam to torsional strain out of a plane including the bicycle frame.
Figure 2:
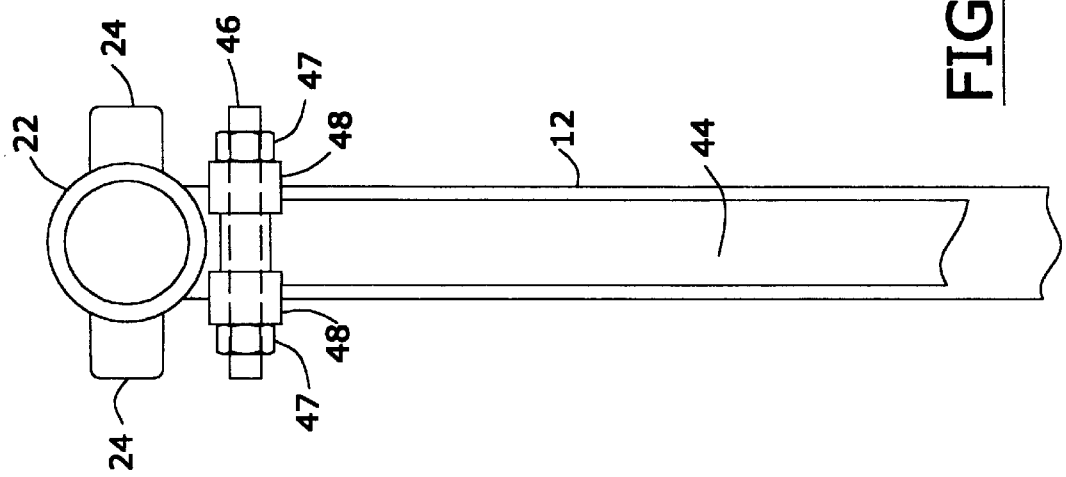
FIG. 2 is a plan view of a portion of the bicycle shown in FIG. 1, showing detail of the attachment of the beam to the frame.

Beam means 43 comprising at least seat-supporting beam 44 is pivotably connected at a first end 45 thereof to frame 12, for example, at a forward position along tube 36 and immediately aft of, or mounted on, fork-supporting tube 22, as shown in FIG. 1. Alternatively, beam 44 may be provided with a bifurcation 49 and pivotably mounted on a rear portion of frame 12, for example, on rear axle 17 (not shown). Preferably, beam 44 is provided with a transverse shaft 46 matable with spaced-apart bearings 48, as shown in FIG. 2, the bearings being disposed in transverse orientation to frame 12 such that beam 44 may pivot therefrom only in a plane containing frame 12. Shaft 46 may be retained by nuts 47. Alternatively, beam 44, when provided with bifurcation 49, may be retained on shaft 46 outboard of bearings 48 as shown in FIG. 3. Such configuration can provide added resistance to torsional stress inherently imparted by the pedaling motion of a rider. Various other beam mounting configurations which tend to limit motion of the beam, and especially motion of the seat, to only the plane containing the bicycle frame are fully within the scope of the present invention.

A seat 50 is mounted on seat-supporting post 52 which may be adjustably disposed at various positions along beam 44 near a second end 54 thereof, as desired by a rider. Shock absorber 56 is pivotably disposed at both ends thereof between beam 44 and frame 12, and preferably between beam 44 and connecting tube 36 as shown in FIG. 1. Shock absorber 56 absorbs road shocks transmitted to it via frame 12 by lengthening or shortening as required, in known fashion, such that the responsive vertical displacement of seat 50 is dampened relative to the incitine vertical displacement of frame 12. Shock absorber 56 may be of known hydraulic construction, and preferably is a gas-filled spring or strut, for example, a gas spring Model 017-00TBD, available from Suspa, Inc., Grand Rapids, Mich., U.S.A.

Preferably, shock absorber 56 may be variably attached to frame 12 at one of a plurality of mounting sites 58 to vary the response of the strut to the intended load, as desired by a rider. Additionally, different capacity struts, which may have differing lengths, diameters, and/or gas pressures, may be used interchangeably as shock absorber 56 as may be desired to vary the intended load range and/or the softness or hardness of the ride.

As beam 44 is a simple pivot arm, the angular attitude of seat 50 with respect to bicycle 10 will change in proportion to change in the height of the seat. Some riders may enjoy this change or even wish to enhance it, whereas other riders may prefer an opposite response or even an invariant seat attitude. The attitude of the seat as a function of beam pivot angle, and therefore seat height, may be controlled through addition of a control rod 64 to beam means 43 as shown in FIGS. 4 and 5.

Control rod 64 is disposed generally parallel with beam 44 and is pivotably connected at a first end 66 to frame 12 and at a second end 68 to extension 70 of seat-supporting post 52 which is pivotably mounted to beam 44, the arrangement forming a quadrangular actuation 72. When actuation 72 is a parallelogram, the attitude of seat 50 is unchanged with pivoting of the beam. When control rod 64 is longer than beam 44, the seat tilts forward as seat height is reduced; when rod 64 is shorter than beam 44, the seat tilts rearward with height reduction. To permit a range of adjustments of rod 64 from shorter to equal to longer than beam 44, rod 64 may be provided at an intermediate location with rod-adjusting means 74, for example, an opposite-threaded turnbuckle apparatus.

Figure 4:
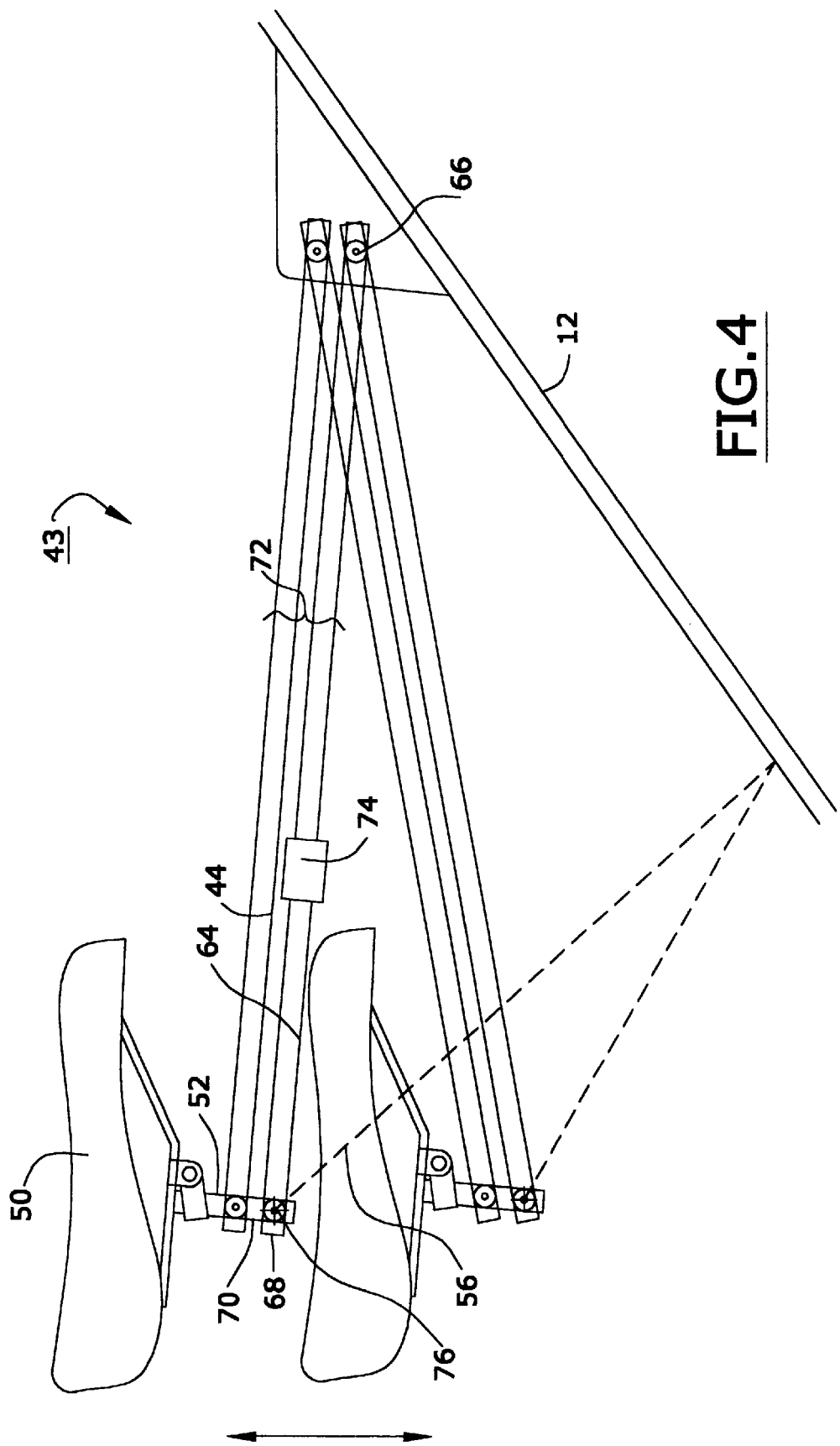
FIG. 4 is an elevational view like that shown in FIG. 1, showing the addition of a control rod to control the attitude of the seat with change in height thereof.

When an attitude-controlling rod 64 is incorporated in a shock-absorbing seat support system in accordance with the invention, shock absorber 56 is pivotably connected to control rod 64 rather than directly to beam 44, as shown in FIG. 4, prefereably at the pivotable joint 76 between rod 64 and seat-support extension 70.

Figure 5:
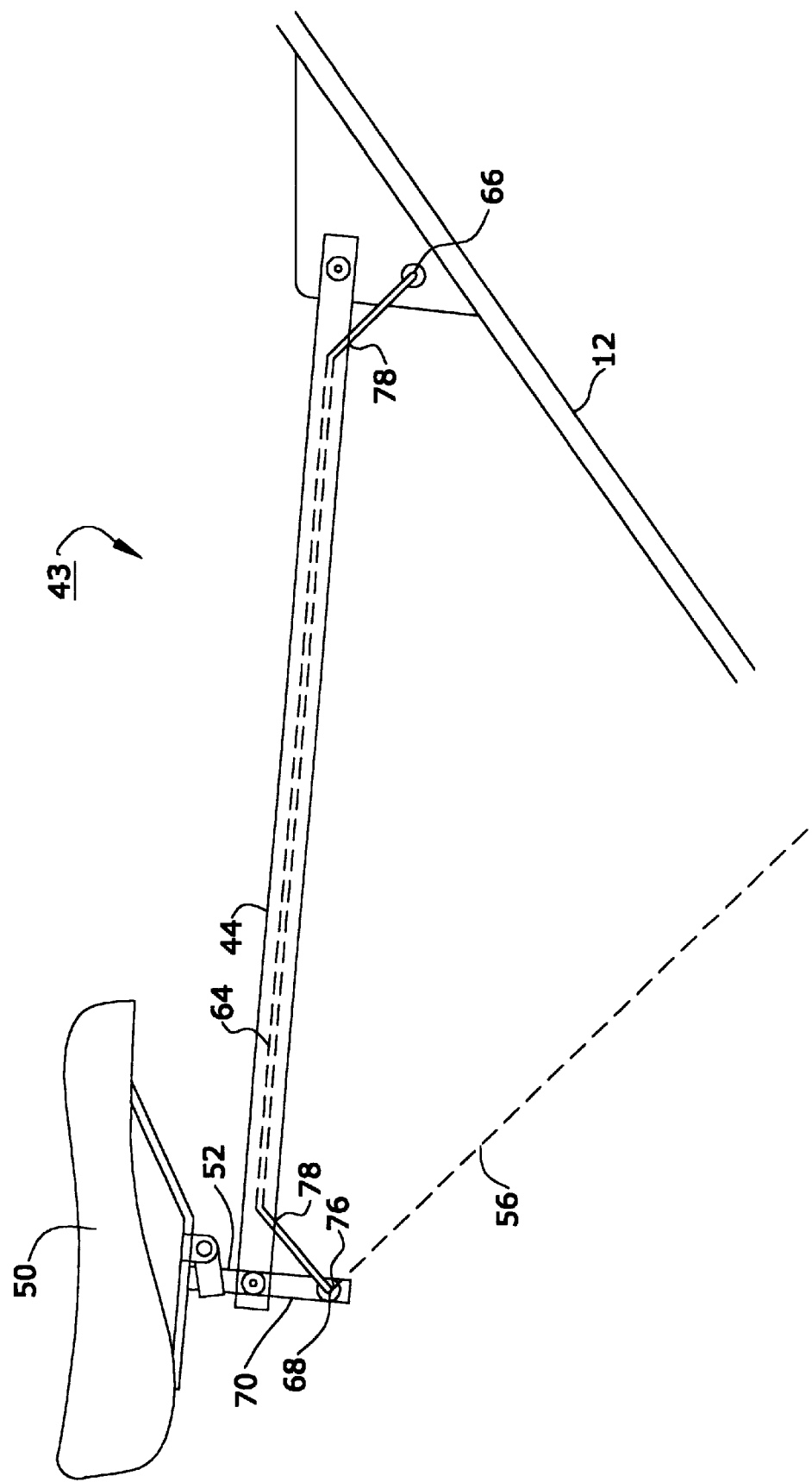
FIG. 5 is an alternative embodiment of the mechanism shown in FIG. 4.

Control rod 64 may be non-linear and may be sheathed for safety and/or convenience within a hollow beam 44 over most of their mutual length, emerging through slotted accesses 78 in beam 44 as shown in FIG. 5, without compromising the effectiveness of rod 64 in controlling attitude. Regardless of the configuration of beam 44 and rod 64, the governing relationship for controlling attitude of seat 50 is the relationship of the four pivot points of quadrangular actuation 72.

Control rod 64 may be disposed either above (not shown) or below beam 44 with equal effect.

As disclosed in the incorporated '733 reference, shock absorber 56 may be provided with valve-actuation means, for example, a rod, to open or close a valve within the strut, whereby the rest length of the strut may be varied at will by a rider to vary the distance between seat 50 and pedals 35 or the ground 61. Preferably, the rod is operationally connected via a conventional sheathed cable 59 to a switch, for example, lever 60 disposed on frame 12 or handlebars 62 whereby the valve may be opened to change the working length of shock absorber 56 at will by a rider. Shock absorber 56 may be mounted with the actuation end adjacent beam 44, cable 59 being led along beam 44 as shown in FIG. 1; or alternatively, and of equal functionality, shock absorber 56 may be mounted inversely, cable 59 being led along connecting tube 36 (not shown).

In operation, in a beginning position wherein the bicycle is vertical and motionless, shock absorber 56 is fully compressed, placing seat 50 in its lowest position. A rider then can easily straddle seat 50 while keeping both feet on the ground 61. This safe and stable position may be assumed at will by the rider at any time the bicycle must be stopped.

The rider begins riding in standing position on the pedals and then opens the internal strut valve by moving lever 60. The strut responds by raising the seat to engage the rider's buttocks. The rider then fixes the operational length of the strut by closing the valve. Further adjustments may be made by the rider to fine-tune the seat height for optimum riding comfort and performance by repeating the movement of the lever. When adjustments are completed, the strut then functions throughout the ride as a conventional gas shock absorber.

To dismount from the bicycle at the conclusion of a ride, the rider, while the bicycle is still in motion, opens the valve while placing his/her full weight on the seat to compress the strut to its starting length, thereby lowering the seat. The rider then closes the valve to hold the strut in the compressed position. When the bicycle stops, the rider may again place both feet safely and securely on the ground.

The shock absorbing means of the present invention may be easily retrofitted to a bicycle lacking a "high" (or "men's") tube. Of course, such means also may be adapted to a men's bicycle, for example, by providing a pair of such shock absorbers disposed on opposite sides of a high bar; such and other embodiments are fully within the spirit and scope of the present invention.

From the foregoing description, it will be apparent that there has been provided an improved shock absorbing means for supporting a bicycle seat, wherein an inflexible beam supporting a seat is pivotably and shock-absorbingly disposed on a rigid bicycle frame. Variations and modifications of the herein described shock-absorbing seat support, in accordance with the invention, will undoubtedly suggest themselves to those skilled in this art. Accordingly, the foregoing description should be taken as illustrative and not in a limiting sense.

What is claimed is:

1. A shock-absorbing bicycle seat support for mounting to a bicycle frame, comprising:
   a) beam means extending longitudinally of said frame and being pivotably connected at a first end thereof to said frame and being supportable of a seat for a rider; and
   b) an adjustable-length gas spring pivotably connected at a first end thereof to said beam means and at a second end thereof to said frame and including remote adjusting means for changing the length of said gas spring to change the height of said seat while said bicycle is in motion and said rider is seated upon said seat, said means for changing including valve actuating means connected to said gas spring and
   wherein said frame for mounting said seat support further comprises a fork-supporting tube and said beam means is pivotably connected to said frame at the rear of said tube, and said beam means further includes a control rod and a seat-supporting post extension wherein said control rod is pivotably connected at a first end thereof to said frame at the rear of said tube and at a second end thereof to said post extension to form a parallelogram articulation wherein all four corners of said parallelogram are pivotable for maintaining a constant angular attitude of said seat with respect to said bicycle at all seat heights.

2. A shock-absorbing bicycle seat support for mounting to a bicycle frame, comprising:
   a) beam means extending longitudinally of said frame and being pivotably connected at a first end thereof to said frame and being supportable of a seat for a rider; and
   b) a shock absorber pivotably connected at a first end thereof to said beam means and at a second end thereof to said frame,
   wherein said beam means further includes a control rod and a seat-supporting post extension wherein said control rod is pivotably connected at a first end thereof to said frame and at a second end thereof to said post extension to form a quadrangular articulation for controlling the attitude of said seat with respect to said bicycle, and
   wherein said beam comprises a hollow tube and said control rod occupies said tube over at least a portion of the length of said control rod.

\* \* \* \* \*